US010492030B2

(12) United States Patent
Natarajan et al.

(10) Patent No.: US 10,492,030 B2
(45) Date of Patent: Nov. 26, 2019

(54) LOCATION-BASED NOTE SHARING

(71) Applicant: Capital One Services, LLC, McLean, VA (US)

(72) Inventors: Arunkumar Natarajan, Glen Allen, VA (US); Venkata Mandali, Glen Allen, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/253,542

(22) Filed: Jan. 22, 2019

(65) Prior Publication Data
US 2019/0289428 A1    Sep. 19, 2019

Related U.S. Application Data

(63) Continuation of application No. 15/922,165, filed on Mar. 15, 2018, now Pat. No. 10,231,090.

(51) Int. Cl.
| | |
|---|---|
| *H04W 24/00* | (2009.01) |
| *H04W 4/02* | (2018.01) |
| *G09B 29/10* | (2006.01) |
| *G06F 16/29* | (2019.01) |
| *H04W 4/18* | (2009.01) |

(52) U.S. Cl.
CPC ............ *H04W 4/025* (2013.01); *G06F 16/29* (2019.01); *G09B 29/10* (2013.01); *H04W 4/185* (2013.01)

(58) Field of Classification Search
USPC ............... 455/456.3; 709/206, 219; 715/753
See application file for complete search history.

(56) References Cited

U.S. PATENT DOCUMENTS

| | | | |
|---|---|---|---|
| 8,151,358 B1 * | 4/2012 | Herold | G06Q 10/107 726/27 |
| 8,447,324 B2 | 5/2013 | Shuman et al. | |

(Continued)

FOREIGN PATENT DOCUMENTS

KR         10-1106079         1/2012

OTHER PUBLICATIONS

Crook, "Boston Pitch-Off Winner Drop Lets You Leave Surprise Messages All Over Town," TechCrunch—Boston Meetup, Nov. 15, 2013, 7 pages, Retrieved from: https://techcrunch.com/2013/11/15/boston-pitch-off-winner-drop-lets-you-leave-surprise-messages-all-over-town/.

(Continued)

*Primary Examiner* — David Q Nguyen
(74) *Attorney, Agent, or Firm* — DLA Piper LLP (US)

(57) ABSTRACT

In one aspect, the present disclosure relates to a method that includes presenting a first user interface (UI) and a second UI on a mobile device. The first UI may include a map display and a control to compose a note. The method may include, in response to a user of the mobile device activating the control to compose the note, presenting a second UI including: an input to receive text for the note, one or more controls to select a picture for the note, and a control to save the note. The method may include, in response to the user activating the control to save the note: determining a location for the note using a geo-location sensor within the mobile device, sending the received text, the selected picture, and the location for the note to a server device, and displaying an indication of the note on the map display based on the location determined for the note.

19 Claims, 10 Drawing Sheets

(56) References Cited

U.S. PATENT DOCUMENTS

| | | | |
|---|---|---|---|
| 9,552,334 B1* | 1/2017 | Meisels | G06F 17/218 |
| 9,826,050 B2 | 11/2017 | Qi et al. | |
| 2007/0200713 A1 | 8/2007 | Weber et al. | |
| 2007/0233367 A1 | 10/2007 | Chen et al. | |
| 2010/0306233 A1 | 12/2010 | Zheng | |
| 2011/0258271 A1 | 10/2011 | Gaquin | |
| 2012/0131645 A1* | 5/2012 | Harm | G06F 21/6218 726/4 |
| 2013/0073686 A1* | 3/2013 | Sandholm | G06F 16/9537 709/219 |
| 2013/0117692 A1* | 5/2013 | Padmanabhan | H04N 21/4126 715/753 |
| 2013/0132488 A1 | 5/2013 | Bosworth et al. | |
| 2013/0235027 A1* | 9/2013 | Sharifi | G06Q 10/0637 345/418 |
| 2014/0114716 A1 | 4/2014 | Flögel | |
| 2014/0214919 A1 | 7/2014 | Taylor et al. | |
| 2015/0264006 A1* | 9/2015 | Parra | H04L 51/32 709/206 |
| 2016/0269543 A1 | 9/2016 | Kang et al. | |
| 2016/0302030 A1* | 10/2016 | White | H04L 67/18 |
| 2018/0041594 A1 | 2/2018 | Qi et al. | |

OTHER PUBLICATIONS

Landry, "Drop a Surprise Message to Your Friend Anywhere in the World With This New App," American Inno, Jun. 19, 2014, 3 pages, Retrieved from: https://www.americaninno.com/boston/drop-messages-iphone-app-location-based-messaging-app/.

Twitter, "Tutorials—Filtering Tweets by Location," www.twitter.com, Retrieved on Jan. 30, 2018, 6 pages, Retrieved from: https://developer.twitter.com/en/docs/tutorials/filtering-tweets-by-location.

Foursquare, "Tips—Help Center," www.foursquare.com, Retrieved on Jan. 30, 2018, 2 pages, Retrieved from: https://support.foursquare.com/hc/en-us/articles/201065360-Tips-.

Pushassist, "Understanding Location Based Push Notification," www.pushassist.com, Retrieved on Jan. 30, 2018, 4 pages, Retrieved from: https://pushassist.com/blog/understanding-location-based-push-notifications/.

* cited by examiner

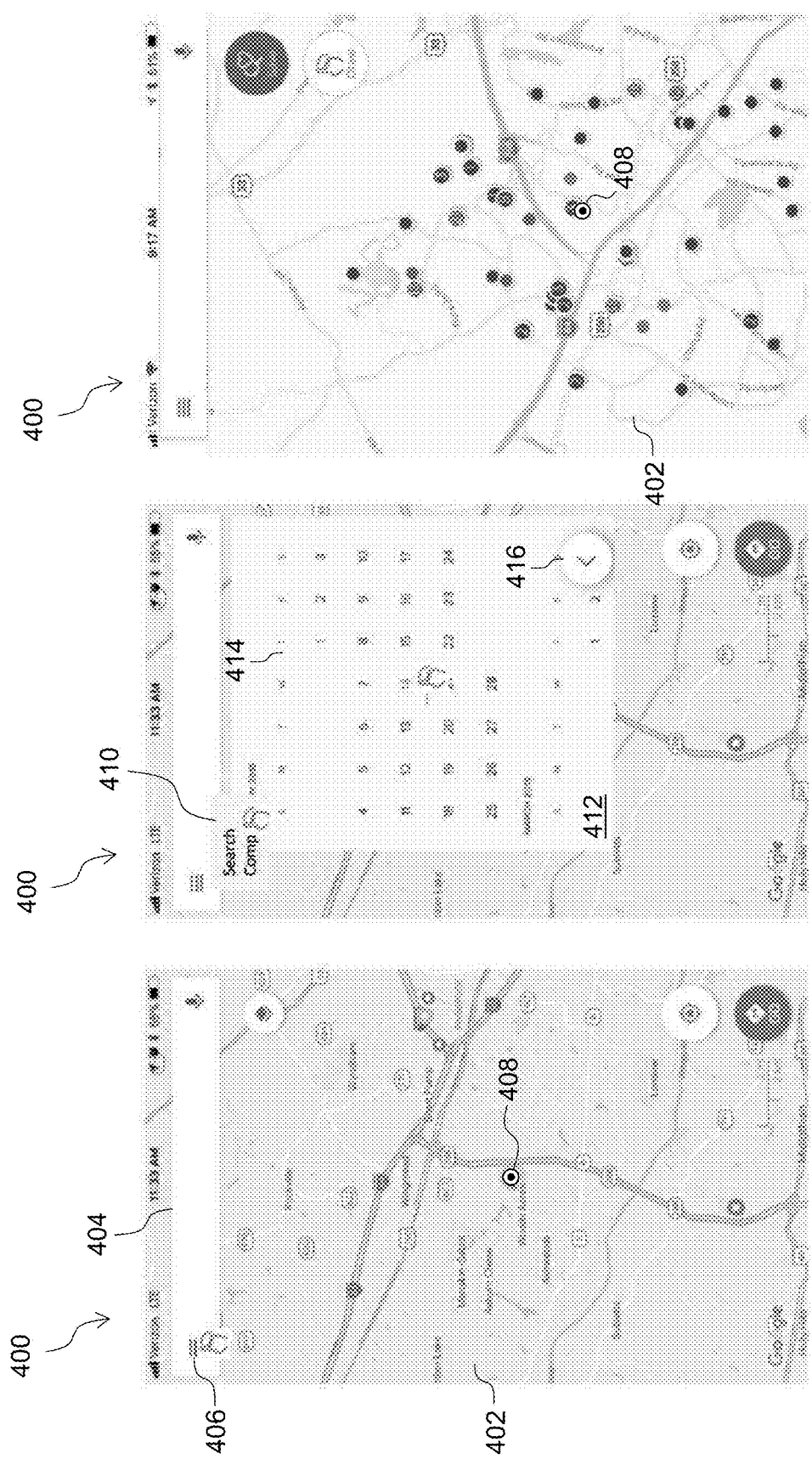

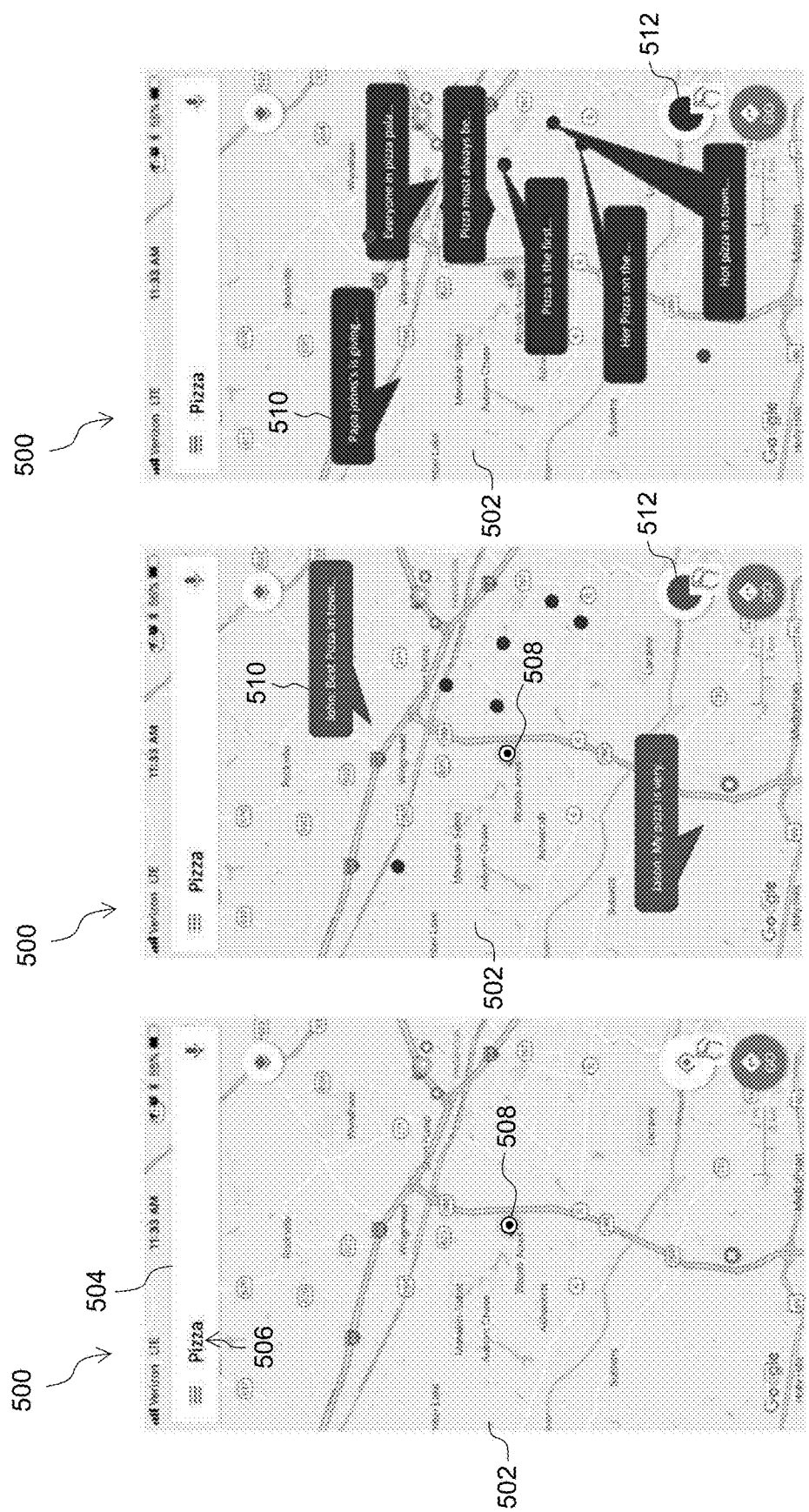

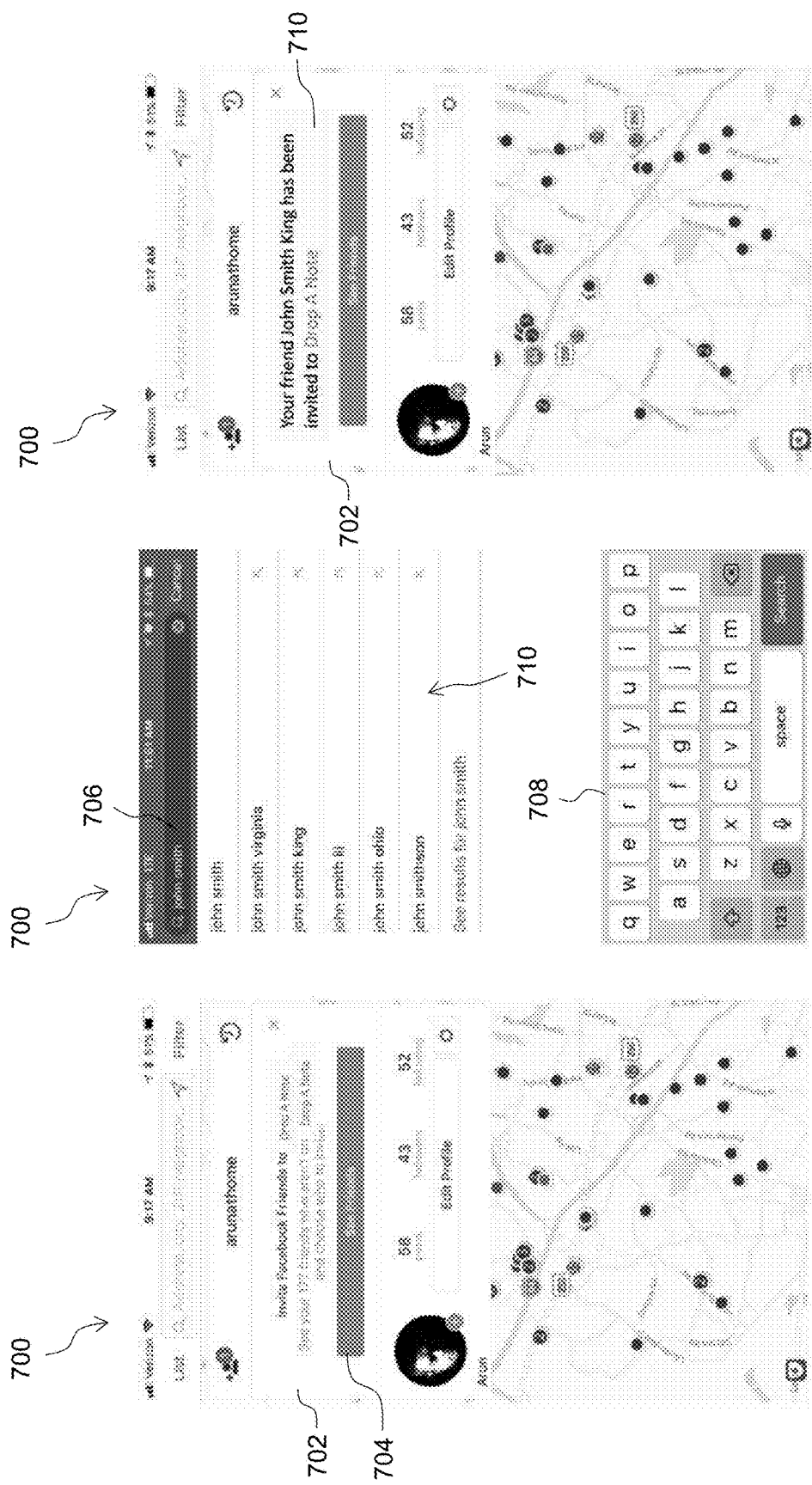

LOCATION-BASED NOTE SHARING

CROSS-REFERENCE TO RELATED APPLICATIONS

This is a continuation of U.S. application Ser. No. 15/922,165, filed Mar. 15, 2018, the content of which is herein incorporated by reference in its entirety.

BACKGROUND

Mobile devices, such as smartphones and tablet computers may include a variety of sensors, such as a camera and a Global Positioning System (GPS) receiver. A mobile device may allow a user to install and run different types of applications (or "apps") on the device.

One category of mobile apps is note-taking apps, which allow a user to create and share textual or graphical notes. Some note-taking apps automatically archive notes by date. However, if a user creates hundreds or thousands of notes, it can be difficult to locate a specific note in the archive, even if the user recalls when (or approximately when) the note was created.

Another category of mobile apps is photo apps for taking and sharing pictures. When a user takes a picture with the mobile device's camera, the photo app may automatically tag the picture with the device's current location (e.g., using the GPS receiver).

SUMMARY

According to one aspect of the present disclosure, a method for location-based note sharing includes presenting a first user interface (UI) on a mobile device, the first UI having a map display and a control to compose a note. In response to a first user of the mobile device activating the control to compose a note, a second UI is presented on the mobile device, the second UI having an input to receive text for the note, one or more controls to select a picture for the note, and a control to save the note. The method further includes, in response to the first user activating the control to save the note, determining a location for the note using a location sensor of the mobile device, sending a create note request to a server device, the create note request including the received text, the selected picture, and the determined location, and displaying an indication of the note on the map display based on the location determined for the note.

In some embodiments, the method includes: sending a search request to the server device, the search request specifying a geographic area; receiving one or more search results from the server device, each of the search results corresponding to a note created within the specified geographic area; and displaying the one or more search results on the map display. In some embodiments, the first UI includes a control to initiate a date-based search of notes and the method includes, in response to the first user activating the control to initiate the date-based search of notes, presenting a third UI on the mobile device, the third UI having an input to select a date range and a control to submit the date-based search, wherein the search request is sent in response to the first user activating the control to submit the date-based search, the search request includes the selected date range, and each of the search results corresponds to a note created within the specified geographic area and within the date range.

In some embodiments, the first UI includes a search text input, the search request is sent in response to the first user entering a keyword into the search text input, the search request includes the entered keyword, and each of the search results corresponds to a note created within the specified geographic area and including the keyword. In some embodiments, the second UI includes a control to select a share level for the note, the create note request includes the share level, and the share level is one of private, public, or shared. In some embodiments, each of the search results corresponds to a note having a share level of: public; private, if the note was created by the first user; or shared, if the note was created by a friend of the first user.

In some embodiments, the specified geographic area is based on at least one of: zoom level of the map display; or a location of the mobile device. In some embodiments, the search request is performed in response to detecting a change in at least one of: the zoom level of the map display; or the location of the mobile device.

According to one aspect of the present disclosure, a method for location-based note sharing includes: receiving notes from a plurality of mobile devices, each of the notes including a location and content, wherein the location for a note is determined by a location sensor of the mobile device; storing the received notes in a database; receiving, from a first mobile device, a search request specifying a first geographic area; identifying, from among the stored notes, a first plurality of notes created within the first specified geographic area; and sending the first plurality of notes to the first mobile device, the first mobile device configured to display the one or more notes on a map display of a user interface (UI).

In some embodiments, the first geographic area is specified as a center location and a radius. In some embodiments, the search request includes a date range, wherein identifying the first plurality of notes includes identifying, from among the stored notes, notes created within the first geographic area and within the date range. In some embodiments, the search request includes a keyword, wherein identifying the first plurality of notes includes identifying, from among the stored notes, notes created within the first geographic area and including the keyword. In some embodiments, the method includes: receiving, from a second mobile device, a request to identify trends within a second geographic area; identifying, from among the stored notes, a first plurality of notes created within the second geographic area and within a predetermined time period; and sending the first plurality of notes to the first mobile device, the first mobile device configured to display the one or more notes on a map display of a user interface (UI).

In some embodiments, the method includes: receiving, from a user device associated with an advertiser, a direct marking request specifying a third geographic area; identifying, from among the stored notes, a second plurality of notes created within the first specified geographic area and within a predetermined time period; for each of the second plurality of notes, sending a direct marketing message to a user associated with the note.

According to one aspect of the present disclosure, a system for location-based note sharing includes a processor, a volatile memory, a non-volatile memory storing computer program code. The computer program code, when executed on the processor causes the processor to execute a process operable to: present a first user interface (UI) on a mobile device, the first UI including a map display, and a control to compose a note. In response to a first user of the mobile device activating the control to compose a note, a second UI is presented on the mobile device, the second UI including an input to receive text for the note, one or more controls to select a picture for the note, and a control to save the note. The process is further operable to, in response to the first user activating the control to save the note: determine a location for the note using a location sensor of the mobile device, send a create note request to a server device, the create note request including the received text, the selected picture, and the determined location, and display an indication of the note on the map display based on the location determined for the note.

In some embodiments, the computer program code causes the processor to execute a process operable to: send a search request to the server device, the search request specifying a geographic area; receive one or more search results from the server device, each of the search results corresponding to a note created within the specified geographic area; and display the one or more search results on the map display. In some embodiments, first UI includes a control to initiate a date-based search of notes, and the computer program code causes the processor to execute a process operable to: in response to the first user activating the control to initiate the date-based search of notes, present a third UI on the mobile device, the third UI including an input to select a date range, a control to submit the date-based search, the search request is sent in response to the first user activating the control to submit the date-based search, the search request includes the selected date range, and each of the search results corresponds to a note created within the specified geographic area and within the date range.

In some embodiments, the first UI includes a search text input, the search request is sent in response to the first user entering a keyword into the search text input, the search request includes the entered keyword, and each of the search results corresponds to a note created within the specified geographic area and including the keyword. In some embodiments, the second UI includes a control to select a share level for the note, and the create note request includes the share level, wherein the share level is one of private, public, or shared. In some embodiments, each of the search results corresponds to a note including a share level of: public; private, if the note was created by the first user; or shared, if the note was created by a friend of the first user.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIGS. 4A, 4B, and 4C illustrate a UI for searching location-based notes by date, according to some embodiments of the present disclosure.

FIGS. 5A, 5B, and 5C illustrate a UI for searching location-based notes by keyword, according to some embodiments of the present disclosure.

FIGS. 7A, 7B, and 7C illustrate a UI for managing a list of friends, according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

According to some embodiments of the present disclosure, a system for location-based note sharing allows users to create and share notes using a mobile app. A user of the app can "drop" notes at their current location and view notes that were dropped by other users within a user's geographic vicinity. In some embodiments, the mobile app allows the user to search for notes by location, date, and/or keyword. The user can choose to have their notes be kept private, shared within a one or more other users ("friends"), or made public. In some embodiments, location-based notes may be analyzed to identify trends among users of the system. In some embodiments, an advertiser can directly market to users that dropped notes within a given geographic area.

Figure 1:
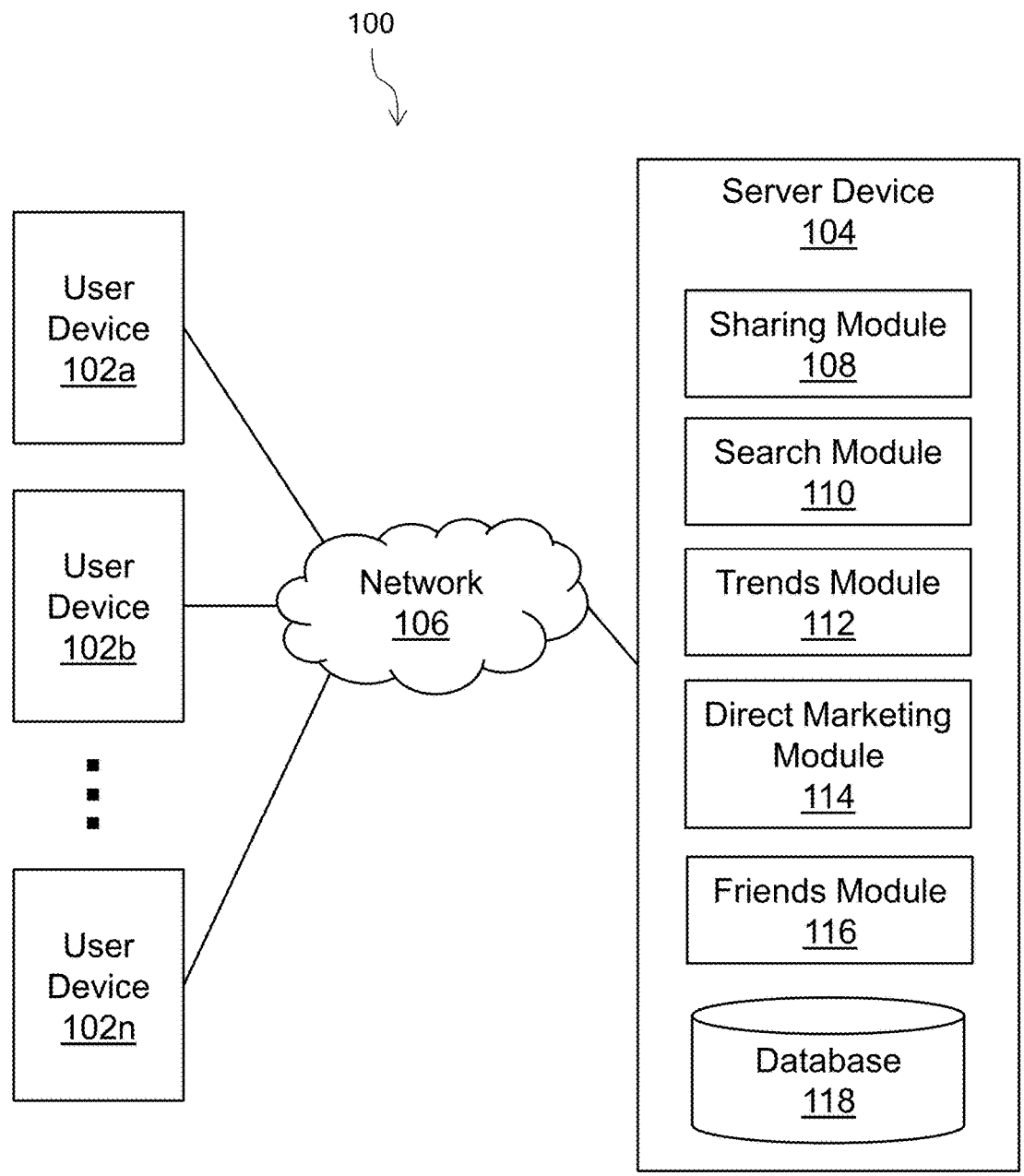
FIG. 1 is a diagram of an illustrative system for location-based note sharing, according to some embodiments of the present disclosure.

FIG. 1 shows a system 100 for location-based note sharing, according to some embodiments of the present disclosure. The illustrative system 100 includes one or more user devices 102a, 102b, . . . , 102n (102 generally) coupled to a server device 104 via a network 106. The service device 104 may include a sharing module 108, a search module 110, a trends module 112, a direct marketing module 114, a friends module 116, and a database 118. The various components of the system 100 may be connected as shown in FIG. 1 or in any other suitable manner. The system components may be connected by one or more wireless or wireline computer networks.

User devices 102 may include smartphones, tablets, or other mobile devices configured to install and run user applications ("apps"). In some embodiments, a user device 102 may run a location-based note sharing app that communicates with server device 104 to store notes and to retrieve notes shared by other user devices. In some embodiments, one or more of the server modules 108-116 may include an application programming interface (API) via which a user device 102 can issue specific types of requests discussed herein below.

Sharing module 108 may be configured to store newly created notes in the database 118. A user device 102 may send a request to the sharing module 108 to store a new note. The request may include the contents of the note, such as text and a picture, along with the location where the note was created and the date/time when the note was created. Location may be specified, for example, as a pair of longitude and latitude values.

In some embodiments, a user may specify sharing preferences when creating a note. Accordingly, the request sent to the sharing module 108 may include, for example, a share level indicating whether the note should be "private," "public," or "shared." A private note may only be viewed by the user that created the note. A public note may be viewed by any user of the system 100. A shared note may be viewed by the author of the note and by any of their "friends" as defined within the system 100. In some embodiments, each user has a list of friends defined within the system 100 and a shared note may be viewed by anyone in that list.

Database 118 may include non-volatile memory configured to store data used to store and share location-based notes. In some embodiments, the database 118 may include a relational database having one or more tables to store users, notes, friends, searches, and advertisers. The tables may be indexed to facilitate searching for stored notes. For example, the notes table may be indexed by location, date, and keyword to allow respective location-, date-, and keyword-based searching. In some embodiments, the database 118 uses a database schema, such as schema 800 described below in the context of FIG. 8. In some embodiments, the database 118 includes a file store wherein pictures or other non-textual note content may be stored.

Search module 110 may be configured to process note search requests. In some embodiments, a search request may specify a geographic area over which to search. The geographic area may be specified, for example, using a center location (e.g., a latitude/longitude pair) and a search radius. In this case, the search module 110 may query the database 118 for notes created within the circular area defined by the center location and search radius. In some embodiments, search module 110 handles date-based and keyword-based search requests. In addition to specifying a geographic area to search, these types of search requests may further limit the search results based on a given date range or keyword, respectively. The search module 110 may restrict its queries to notes that were created by the user making the request, notes that were shared by a friend of the user, and notes that are public.

Trends module 112 may be configured to identify trends within particular geographic areas based on notes stored within the database 118. In some embodiments, a trend is identified by searching for notes within a common geographic area and within a predetermined time period. For example, a trend may include ten (10) notes created within the last hour, all within some relatively small geographic area (e.g., a bounded geographic region of one 10,000 square feet). The predetermined time period may be, for example, the last hour, last 24 hours, or last 48 hours.

In some embodiments, the trends module 112 is configured to handle trend requests, which are requests to identify trends. In some embodiments, a trend request may specify a geographic area and/or a time period. The trends module 112 may analyze notes stored in the database 118 to identify trends within the specified geographic area and/or time period.

In some embodiments, background processing may be used to periodically and/or continuously identify trends within selected geographic areas. The results of the background processing may be stored in the database 118 and/or in memory and used to process subsequent trend requests.

Direct marketing module 114 may be configured to identify users that have created notes within a given geographic area and time period, and to send targeted advertising to those users. In some embodiments, an advertiser may use a user device 102 to interact with the marketing module 114. For example, an advertiser may install a direct marketing app on their mobile device 102. The direct marketing app could be part of the location-based note sharing app or a separate app. The direct marketing module 114 may receive a request to send direct marketing to users that have recently created notes within a specified geographic area. The direct marketing module 114 may then, for example, send a push notification, an email, etc. to each of those users.

In some embodiments, the trends module 112 and/or direct marketing module 114 may allow a geographic area to be specified descriptively within a request. For example, a user may specify a street address, a business name, or the name of a landmark. For example, an advertiser may specify the name of a mall in order to target users who visited that mall. The modules 112, 114 may use a location database or a third party location service to translate the descriptive geographic area into latitude and longitude values which can be used to search for notes in the database 118.

Friends module 116 may be configured to manage lists of friends for users of the location-based note sharing app. The app may send requests to the friends module 116 to add or remove people from a user's friend list.

Figure 2:
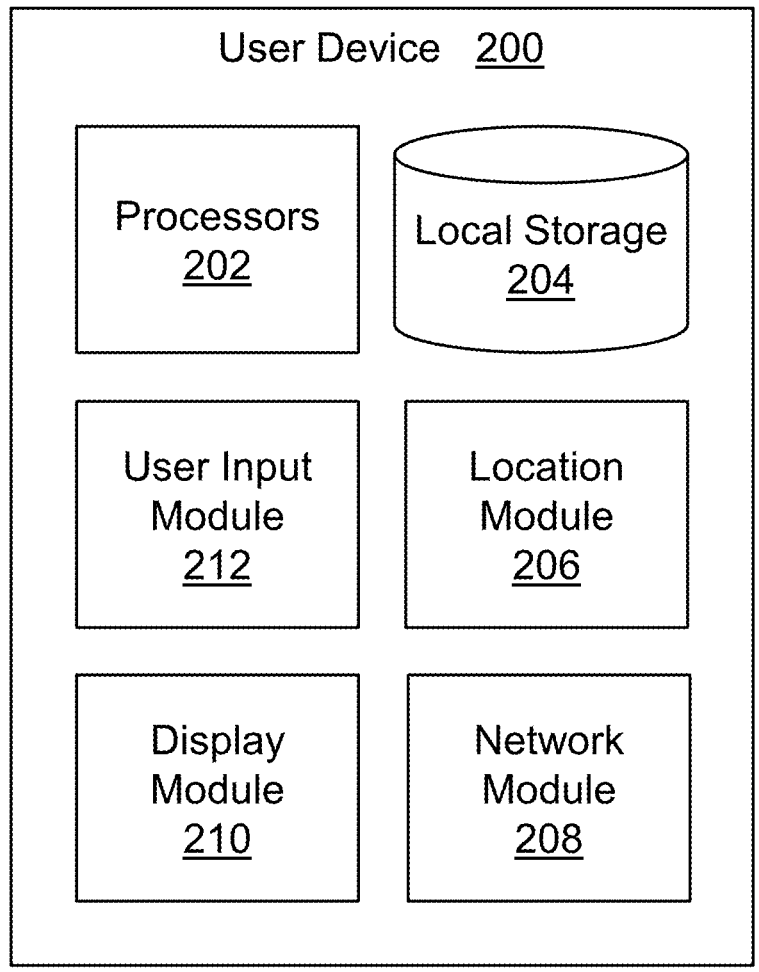
FIG. 2 is a diagram of an illustrative user device, according to some embodiments of the present disclosure.

FIG. 2 is a diagram of an user device 200, according to some embodiments of the present disclosure. The illustrative user device 200 may include one or more processors 202, local storage 204, a location module 206, a network module 208, a display module 210, and a user input module 212. Local storage 210 may include volatile and/or non-volatile memory. In some embodiments, local storage 210 is configured to store computer program instructions executable by the processors 202.

Location module 206 may include one or more sensors that can be used to determine the location of the user device 202. In some embodiments, location module 206 may correspond to a Global Positioning System (GPS) receiver. Network module 208 may include hardware and/or software configured to communicate with a server device (e.g., server device 104 in FIG. 1) via a network 106. In some embodiments, network module 208 may include a wireless transceiver, such as a WiFi receiver.

Display module 210 may include hardware and/or software to display user interfaces (UIs) to a user. User input module 212 may include hardware and/or software to receive input from the user. In some embodiments, the user device 200 includes a touchscreen device for displaying UIs and receiving user input. In some embodiments, user input module 212 may include a virtual keyboard via which the user can enter text.

In some embodiments, local storage 204 may store instructions for a local-based note sharing app and/or a direct marketing app. In some embodiments, local storage 210 may be configured to store data associated with the note-taking app. In some embodiments, the app stores newly created notes in local storage 210 prior to the note being stored on the server device (e.g., server device 104 of FIG. 1).

Figure 3A:
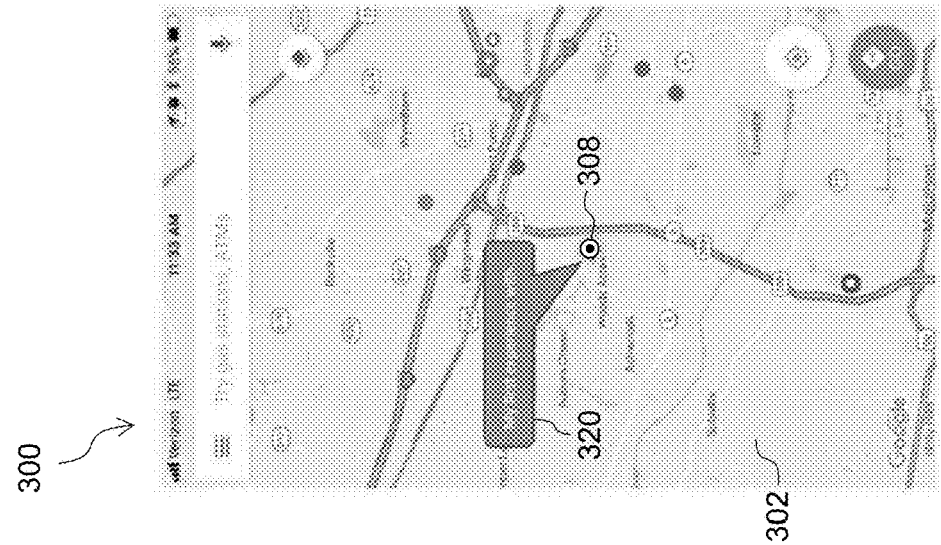
FIGS. 3A, 3B, and 3C illustrate a user interface (UI) for creating a location-based note, according to some embodiments of the present disclosure.
Figure 3B:
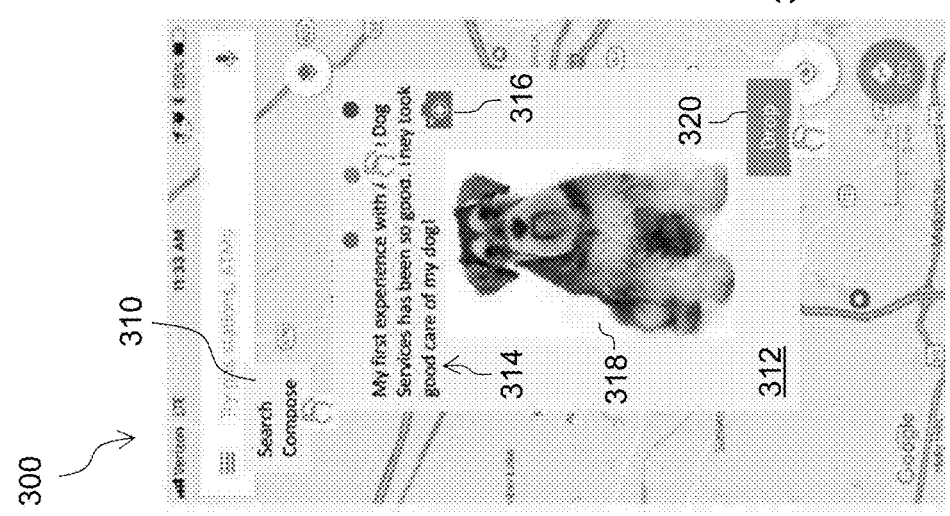
Figure 3C:
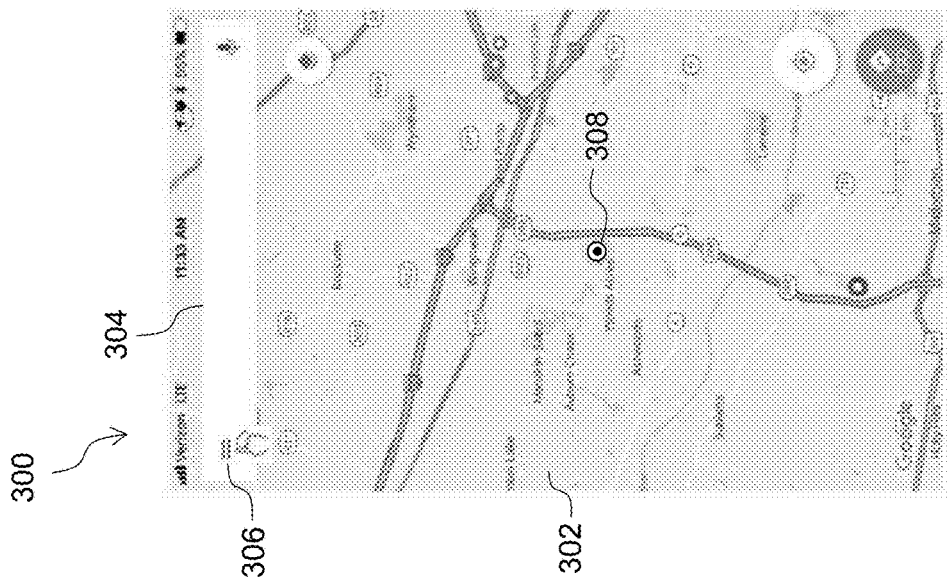

FIGS. 3A, 3B, and 3C illustrate a UI 300 for creating a location-based note, according to some embodiments of the present disclosure. The UI 300 may be implemented within a location-based note sharing app. As shown in FIG. 3A, UI 300 may include a map display 304, a search bar control 304, and a menu control 306. The map display 304 may include a device location indicator 308 showing the device's location relative to the map display. The user can activate menu control 306 using, for example, a touch input.

As shown in FIG. 3B, in response to the user activating the menu control 306, a popup menu 310 may be displayed. The popup menu 310 may include a "Search" menu item and a "Compose" menu item. In response to the user selecting the "Compose" menu item, a modal window 312 may be displayed to enable the user to compose a note. The illustrative modal window 312 includes a text input 314, a picture selection control 316, a picture display control 318, and a save button 320 ("Drop"). The user may enter text for the note in the text input 314 using, for example, a virtual keyboard. In some embodiments, the user may add a picture to the note by activating the picture selection control 316 and selecting a picture stored on the mobile device, in the cloud, etc. After entering text and/or selecting a picture for the note, the user may activate the save button 320. In some embodiments, the modal window 312 may include one or more sharing preferences for the note. For example, the modal window 312 may include a control allowing the user to specify a share level for the note (e.g., "private," "public," or "shared").

As shown in FIG. 3C, in response to the user activating the save button 320, the modal window 312 may be dismissed and a new note may be created and displayed on the map display 302. The new note may be displayed, for example, as a banner 320 with an arrow pointing to the location 308 where the note was taken.

Also in response to the user activating the save button 320, a request may be sent to a server device module (e.g., sharing module 108 in FIG. 1) to create a new location-based note. The request may include the entered text, the selected picture, and the location where the note was created (e.g., the current location determined by a location sensor of the user device).

In some embodiments, the note-sharing app may allow a user to choose the location for the note. For example, the user may select a location on the map display 304 before activating the compose modal window 312, causing the note may be "dropped" at the selected location. Thus, a user could drop a note at some location where they (or a friend) plan to be in the future, allowing the user/friend to easily access the note when they are in the vicinity of that location.

In some embodiments, the map display 302 may display notes that the user created, along with notes created by the user's friends, and/or public notes. The notes may be indicated on the map using, for example, circular markers as shown. In some embodiments, different types of notes (e.g., public notes versus private notes) may be indicated on the map using differently colored markers or using other visual cues. In some embodiments, the user can tap on a marker to display the corresponding note created at that location.

FIGS. 4A, 4B, and 4C illustrate a UI 400 for searching location-based notes by date, according to some embodiments of the present disclosure. The UI 400 may be implemented within a location-based note sharing app. As shown in FIG. 4A, UI 400 may include a map display 402, a search bar control 404, and a menu control 406. The map display may include a device location indicator 408 showing the device's location relative to the map display.

As shown in FIG. 4B, in response to the user activating the menu control 406, a popup menu 410 may be displayed. The popup menu 410 may include a "Search" menu item and a "Compose" menu item. In response to the user activating the "Search" menu item, a modal window 412 may be displayed. The illustrative modal window 412 includes a date picker 414 and a submit button 416. The user can select a date, or a range of dates, using the date picker 414.

As shown in FIG. 4C, in response to the user activating the submit button 416, the modal window 412 may be dismissed and the map display 402 may be updated to include markers (e.g., circular markers as shown) corresponding to notes that were created in the selected date range and near the user's current location 408. In some embodiments, the location-based note sharing app sends a request to a server device module (e.g., search module 110 of FIG. 1) to perform the search and return the set of notes that are displayed on the map display 402. In some embodiments, the request includes the selected date range, and information about the geographic area to search. The specified geographic area may be based, for example, on the current device location 408 and on a zoom level of the map display 402. As discussed above with FIGS. 3A-3C, different types of notes may be displayed using different colors or other visual cues on the map display 402.

FIGS. 5A, 5B, and 5C illustrate a UI 500 for searching location-based notes by keyword, according to some embodiments of the present disclosure. The UI 500 may be implemented within a location-based note sharing app. As shown in FIG. 5A, UI 500 may include a map display 502, a search bar control 504, and a text input 506. The map display may include a device location indicator 508 showing the device's location relative to the map display. In response to user activating the text input 506, a virtual keyboard (not shown) may be presented, allowing a user to enter text for a keyword search (e.g., "Pizza").

Referring to FIG. 5B, after text has been entered into the text input 506, the map display 502 may be updated to include markers (e.g., circular markers as shown) corresponding to notes that were created in the selected date range and near the user's current location 508. In some embodiments, the location-based note sharing app sends a request to a server device module (e.g., search module 110 of FIG. 1) to perform the search and return the set of notes that are displayed on the map display 502. In some embodiments, the request includes the text entered in the text input 506 and information about the geographic area to search. The specified geographic area may be based, for example, on the current device location 508 and on a zoom level of the map display 502. As discussed above with FIGS. 3A-3C, different types of notes may be displayed using different colors or other visual cues on the map display 502.

In some embodiments, the UI 500 may include a control 512 for selecting the types of notes are displayed on the map 502. For example, the user may tap control 512 to toggle between viewing notes shared by the user's friends, as illustrated in FIG. 5B, and viewing "public" notes created by other users of the note-sharing platform, as illustrated in FIG. 5C. In some embodiments, an API search request is performed in response to the user activating control 512. The search request may specify the type of notes to be displayed.

Figures 6A, 6B:
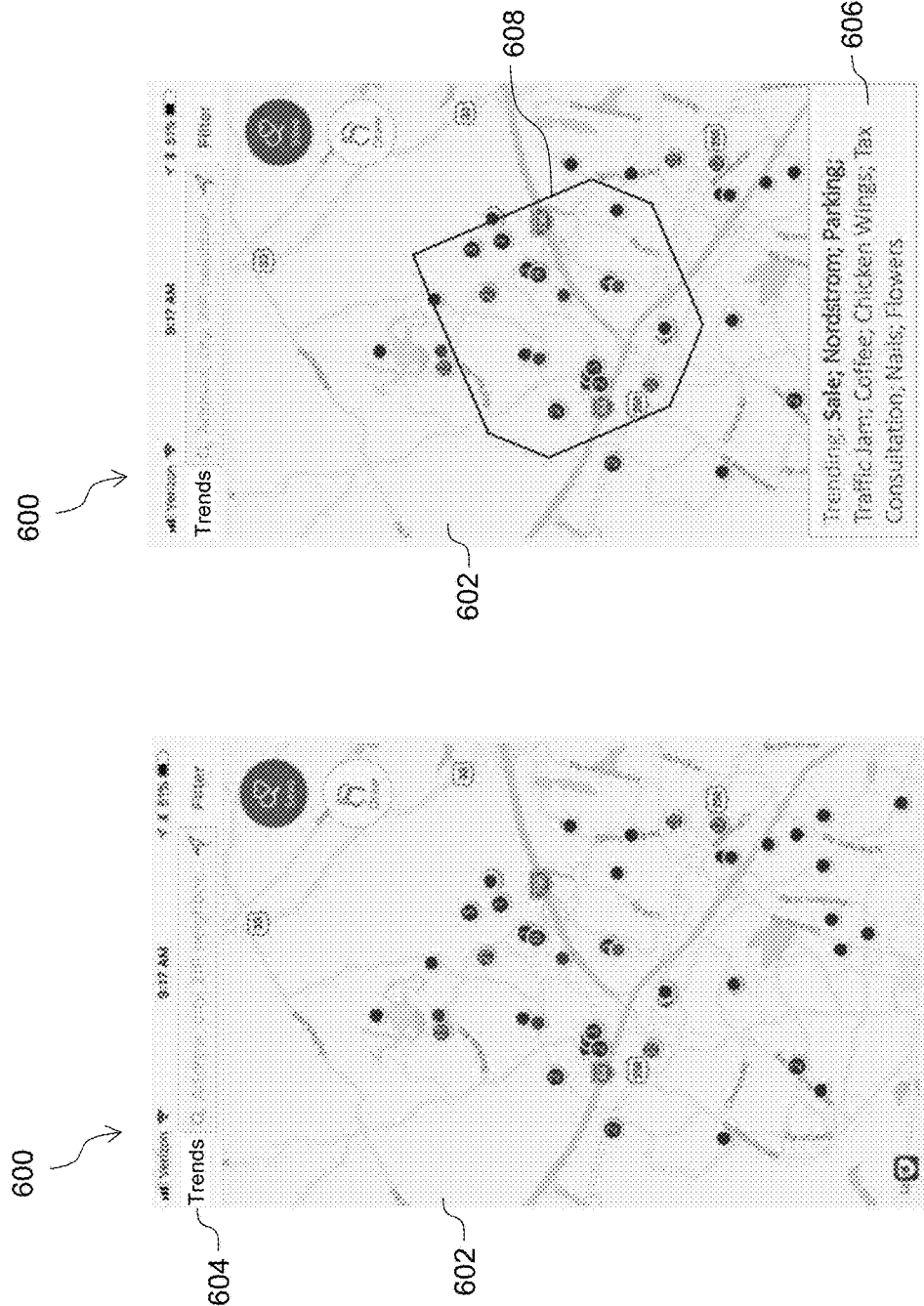
FIGS. 6A and 6B illustrate a UI for viewing trends based on location-based notes, according to some embodiments of the present disclosure.

FIGS. 6A and 6B illustrate a UI 600 for viewing trends, according to some embodiments of the present disclosure. The UI 600 may be implemented within a location-based note sharing app. As shown in FIG. 6A, the UI 600 may include a map display 602 and a control 604 to view trends. The map display 602 may include markers (e.g., circular markers as shown) corresponding to notes that were created within the geographic area represented by the map.

As shown in FIG. 6B, in response to the user activating the control 604, one or more trends may be identified. For example, as shown in FIG. 6B, the UI 600 may be updated to indicate that keywords 606 are trending within the geographic area 608. The trending keywords 606 may correspond to keywords that appear in notes created within the geographic area 608. In some embodiments, the location-based note sharing app sends a request to a server device module (e.g., trends module 112 of FIG. 1) to determine the trending keywords 606 and/or the geographic area 608.

FIGS. 7A, 7B, and 7C illustrate a UI 700 for managing a list of friends, according to some embodiments of the present disclosure. The UI 700 may be implemented within a location-based note sharing app. As shown in FIG. 7A, the UI 700 may include a user preferences panel 702 for display information and controls associated with a user of the app. The user preferences panel 702 includes a control 704 to add people to the user's list of friends.

As shown in FIG. 7B, in response to the user activating the control 704, the UI 700 may display a search box 706, a virtual keyboard 708, and a contacts list 710. The contacts list 710 may include the names for one or more contacts of the user. In some embodiments, the contacts list 710 may be populated from an external data source, such as a contacts app that is separate from the notes app. The user may filter the items within the contacts list 710 by entering text into the text input 706 using the virtual keyboard 708.

In response to the user selecting (e.g., tapping) an item in the contacts list 710, a friend invitation may be sent to that contact and a confirmation message 710 may be displayed, as shown in FIG. 7C. In some embodiments, an email may be sent to an email address associated with the selected contact. In some embodiments, a request is sent to a server device module (e.g., friends module 116 of FIG. 1) to add the contact to the user's list of friends.

Figure 8:
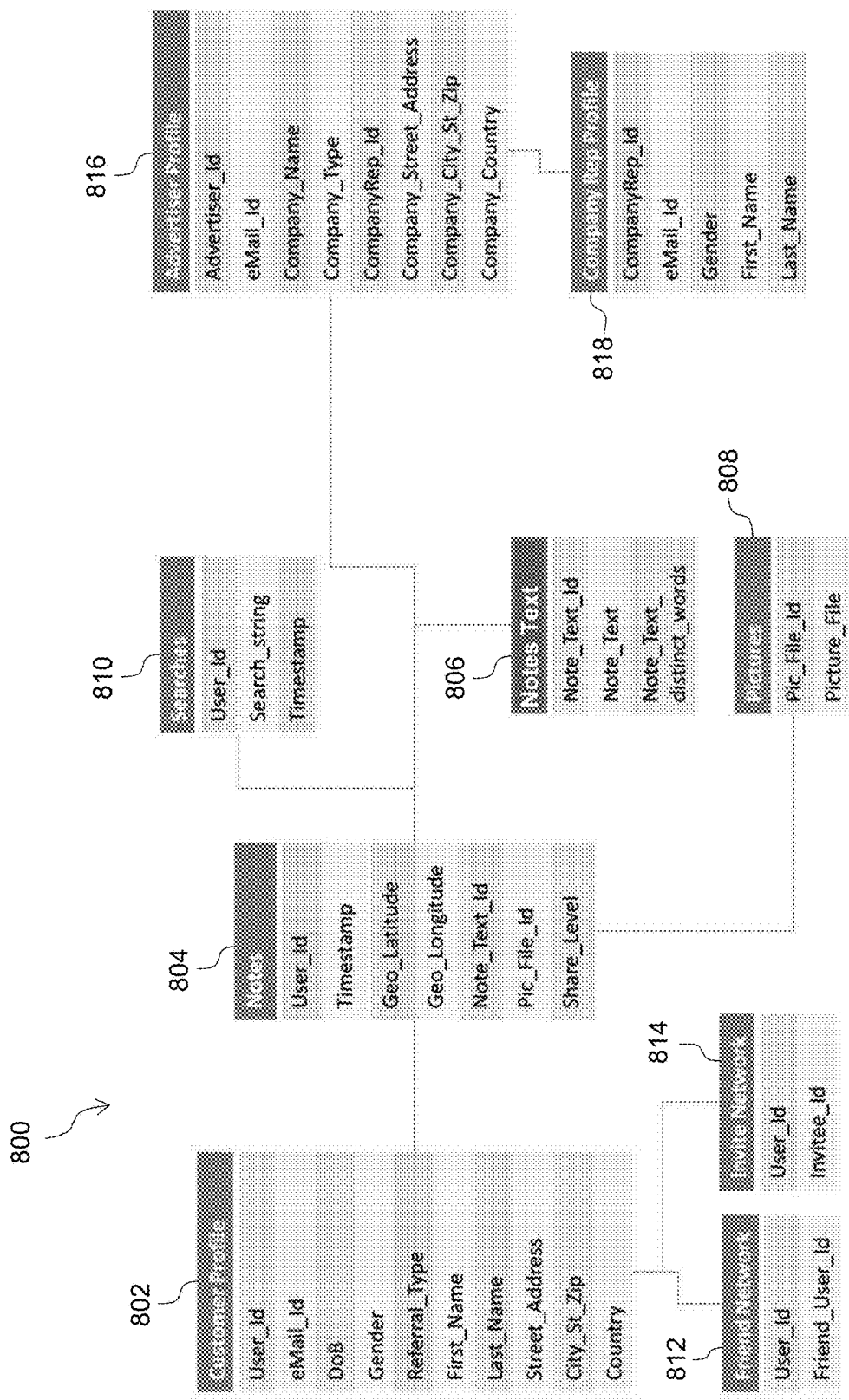
FIG. 8 is a diagram illustrating a database schema that may be used for location-based note sharing, according to some embodiments of the present disclosure.

FIG. 8 shows a database schema 800 that may be used for location-based note sharing, according to some embodiments of the present disclosure. The illustrative schema 800 includes a users table 802, a notes table 804, a notes text table, a pictures table 808, a searches table 810, a friends table 812, a friend invitations table 814, an advertisers table 816, and a company representatives table 818. In some embodiments, the tables may connected (e.g., using foreign keys) as illustrated in FIG. 8.

Figure 9:
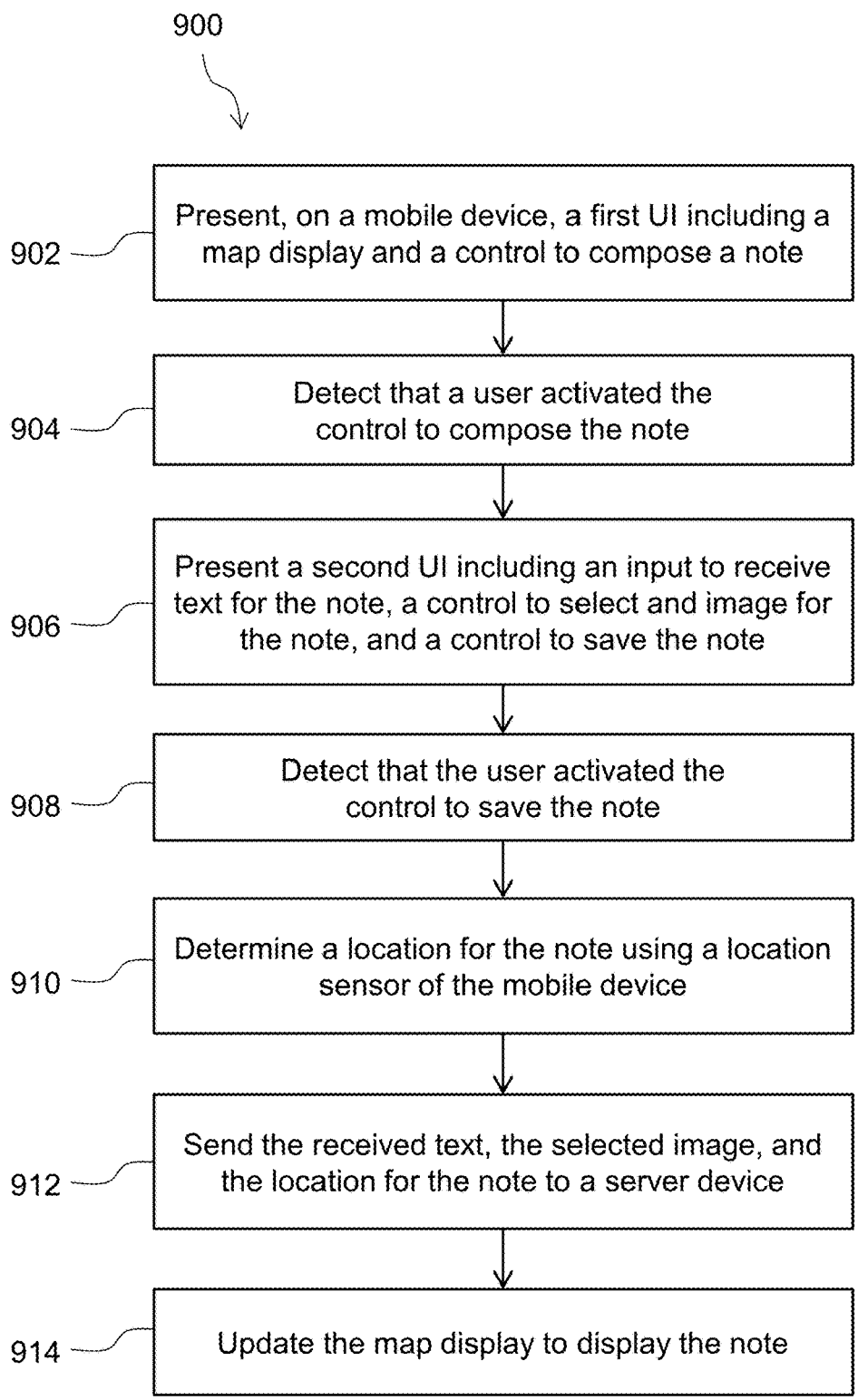
FIGS. 9 and 10 are flow diagrams showing processing that may occur within the system for location-based note sharing, according to some embodiments of the present disclosure.

FIG. 9 shows a method 900 that may be used within a system for location-based note sharing, according to some embodiments of the present disclosure. In some embodiments, the method 900 may be implemented within a user device, such as a user device 102 shown in FIG. 1.

At block 902, a first user interface (UI) may be presented on a mobile device. The first UI may include a map display and a control to compose a note. In response to detecting that a user activated the control to compose the note (block 904) a second UI may be presented (block 906). The second UI may include a text input to receive text for the note, a control to select an image for the note, and a control to save the note.

In response to detecting the user activated the control to save the note (block 908), a location may be determined for the note using a location sensor of the mobile device (block 910). At block 912, a request to create a note may be sent to a serer device, the request comprising the received text, the selected image, and the location. In some embodiments, the server device is configured to store the note in a relation database, indexed by date and location.

At block 914, the map display may be updated to display the first note. For example, a marker may be added to the map display indicating the location where the note was created.

Figure 10:
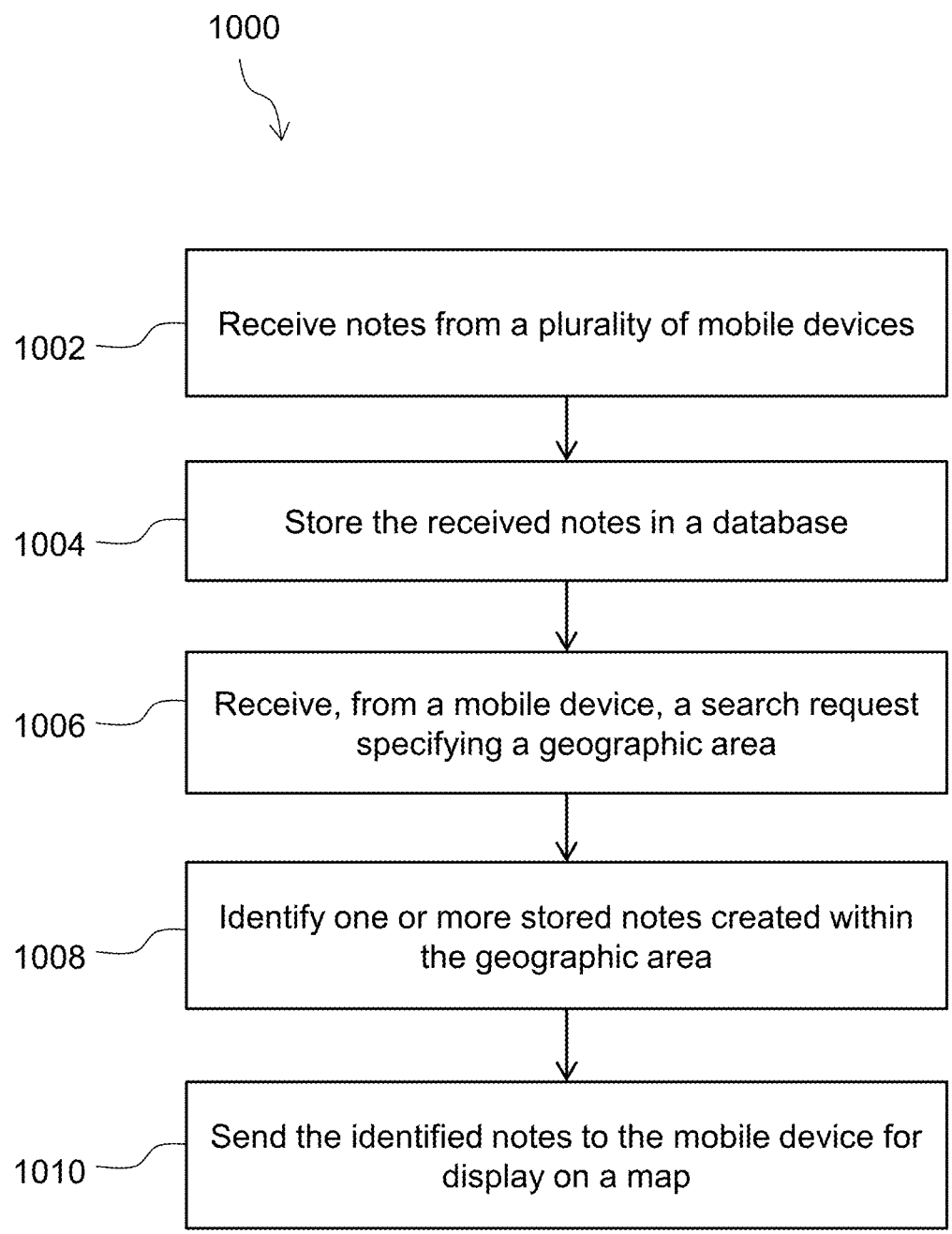

FIG. 10 shows a method 1000 that may be used within a system for location-based note sharing, according to some embodiments of the present disclosure. In some embodiments, the method 1000 may be implemented within a server device, such as a server device 104 shown in FIG. 1. At block 1002, notes may be received from a plurality of mobile devices. Each note may include content (e.g., text and pictures) and a location. At block 1004, the notes may be stored within a database. At block 1006 location-based search request may be received from a mobile device, the request specifying a geographic area. At block 1008, one or more of the stores notes are identified as having been created within the geographic area. At block 1010, the identified notes are returned to the mobile device. The mobile device may display the notes on a map display. In some embodiments, the search request includes one or more additional search criteria, such as a date range or a keyword. The additional search criterial may be used to filter/restrict the identified notes that are returned to the mobile device.

Methods described herein may represent processing that occurs within a system for sharing location-based notes (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for location-based note sharing, the method comprising:
   receiving notes from a plurality of user devices, each of the notes comprising a location and content, wherein the location for a note is determined by a location sensor of the user device;
   storing the received notes in a database;
   receiving, from a first user device, a request to identify trends within a first geographic area;
   identifying one or more trends within the first geographic area based on the stored notes;
   identifying, from among the stored notes, a first plurality of notes associated with the one or more trends; and
   sending the first plurality of notes to the first user device, the first user device configured to display the one or more notes on a map display of a user interface (UI).

2. The method of claim 1 wherein receiving notes from a plurality of user devices comprises receiving create note requests from the plurality of user devices, each of the create note requests comprising text and an image.

3. The method of claim 2 wherein at least one of the create note requests comprises a share level for a note, wherein the share level is one of private, public, or shared, wherein storing the received notes in the database comprises storing a share level for each of the received notes.

4. The method of claim 3 wherein identifying the first plurality of notes comprises identifying notes comprising a share level of:
   public;
   private, if the note was created by a user of the first user device; or
   shared, if the note was created by a friend of the user of the first user device.

5. The method of claim 1 wherein the first geographic area is specified as a center location and a radius.

6. The method of claim 1 wherein identifying the first plurality of notes comprises identifying, from among the stored notes, notes created within the first geographic area and comprising a keyword.

7. The method of claim 1 comprising:
   receiving, from a user device associated with an advertiser, a direct marking request specifying a second geographic area;
   identifying, from among the stored notes, a second plurality of notes created within the second geographic area and within a predetermined time period; and
   for each of the second plurality of notes, sending a direct marketing message to a user associated with the note.

8. The method of claim 1 comprising:
   receiving, from the first user device, a request to add a contact to a list of friends associated with the user of the first user device;
   adding the contact to the list of friends associated with the user of the first user device;
   storing the list of friends associated with the user of the first user device in the database.

9. The method of claim 8 wherein identifying the first plurality of notes comprises identifying notes using the list of friends associated with the user of the first user device.

10. A system for location-based note sharing, the system comprising:
    a processor;
    a database; and
    a non-volatile memory storing computer program code that when executed on the processor causes the processor to execute a process operable to:
      receive notes from a plurality of user devices, each of the notes comprising a location and content, wherein the location for a note is determined by a location sensor of the user device;
      store the received notes in the database;
      receive, from a user device associated with an advertiser, a direct marking request specifying a first geographic area;
      identify, from among the stored notes, a first plurality of notes created within the first geographic area and within a predetermined time period; and
      for each of the first plurality of notes, send a direct marketing message to a user associated with the note.

11. The system of claim 10 wherein the computer program code that when executed on the processor causes the processor to execute a process operable to:
    receive create note requests from the plurality of user devices, each of the create note requests comprising text and an image.

12. The system of claim 11 wherein at least one of the create note requests comprises a share level for a note, wherein the share level is one of private, public, or shared, wherein the computer program code that when executed on the processor causes the processor to execute a process operable to store a share level for each of the received notes.

13. The system of claim 12 wherein the computer program code that when executed on the processor causes the processor to execute a process operable to identify notes comprising a share level of:
    public;
    private, if the note was created by a user of the first user device; or
    shared, if the note was created by a friend of the user of the first user device.

14. The system of claim 10 wherein the first geographic area is specified as a center location and a radius.

15. The system of claim 10 wherein identifying the first plurality of notes comprises identifying, from among the stored notes, notes created within the first geographic area and comprising a keyword.

16. The system of claim 10 wherein the computer program code that when executed on the processor causes the processor to execute a process operable to:

receive, from a second user device, a request to identify trends within a second geographic area;

identify, from among the stored notes, a second plurality of notes created within the second geographic area and within a predetermined time period; and send the second plurality of notes to the second user device, the second user device configured to display the one or more notes on a map display of a user interface (UI).

17. The system of claim 10 wherein the computer program code that when executed on the processor causes the processor to execute a process operable to:

receive, from the first user device, a request to add a contact to a list of friends associated with the user of the first user device;

add the contact to the list of friends associated with the user of the first user device;

store the list of friends associated with the user of the first user device in the database.

18. The system of claim 17 wherein the computer program code that when executed on the processor causes the processor to execute a process operable to:

identify the first plurality of notes using the list of friends associated with the user of the first user device.

19. A method for location-based note sharing, the method comprising:

receiving notes from a plurality of user devices, each of the notes comprising a location and content, wherein the location for a note is determined by a location sensor of a respective user device;

storing the received notes in a database;

receiving, from a first user device, a search request specifying a first geographic area and a date range, wherein the first user device is configured to present a user interface (UI) comprising an input to select the date range and a control to submit a date-based search, wherein the search request is received in response to a user of the first user device activating the control to submit a date-based search;

identifying, using a list of friends associated with the user of the first user device, a first plurality of notes from among the stored notes, the first plurality of notes created within the first specified geographic area within the date range; and sending the first plurality of notes to the first user device, the first user device configured to display the one or more notes on a map display of a user interface (UI).

* * * * *